Oct. 27, 1931.  A. WHEELER  1,829,319
CAMERA
Filed May 14, 1930

INVENTOR,
Arthur Wheeler,
BY D. Clyde Jones
ATTORNEY.

Patented Oct. 27, 1931

1,829,319

UNITED STATES PATENT OFFICE

ARTHUR WHEELER, OF ROCHESTER, NEW YORK, ASSIGNOR TO FOLMER GRAFLEX CORPORATION, OF ROCHESTER, NEW YORK, A CORPORATION OF DELAWARE

CAMERA

Application filed May 14, 1930. Serial No. 452,211.

This invention relates to adjustable lens mounts and more particularly to adjustable lens mounts for cameras.

In former cameras used for aerial photography it is customary to focus the lens unit at infinity and then to lock it in this position. For this reason aerial cameras have not been adapted for photographing near objects with the result that if a photographer desired to obtain both aerial photographs and closeup photographs it has been necessary for him to be provided with two cameras.

In cameras of this type it is also customary to provide a shield for the lens unit which serves among other purposes to prevent scattered rays of light from passing into the camera. This shield is usually in the form of a truncated pyramid or cone fastened to the camera and surrounding the lens mount, with the open free end thereof nearest to the object to be photographed. In order to shield the lens unit effectively from scattered rays of light and to reduce the size of the camera, this cone at its free end is not materially larger than the diameter of the lens mount. For this reason even if the operator unlocked the lens mount to change the focus of the lens unit it would be necessary for him to insert his hand in the opening in the cone to rotate the adjustable focusing member of the lens mount with the result that the graduations indicating the proper focus of the lens unit would be obscured by the operator's hand. This would make it necessary for the operator to change the focus adjustment by small increments of movement and to withdraw his hand from the cone opening after each small adjustment so that the focusing graduations can become visible.

In accordance with one feature of the present invention it is proposed to equip cameras used in aerial photography with readily adjustable focusing means in order that they may be used both for distant and closeup views. In accordance with another feature of the invention, a focusing member is provided with means actuated near the free end of the cone whereby the focusing device may be accurately and quickly adjusted.

Figure 1:
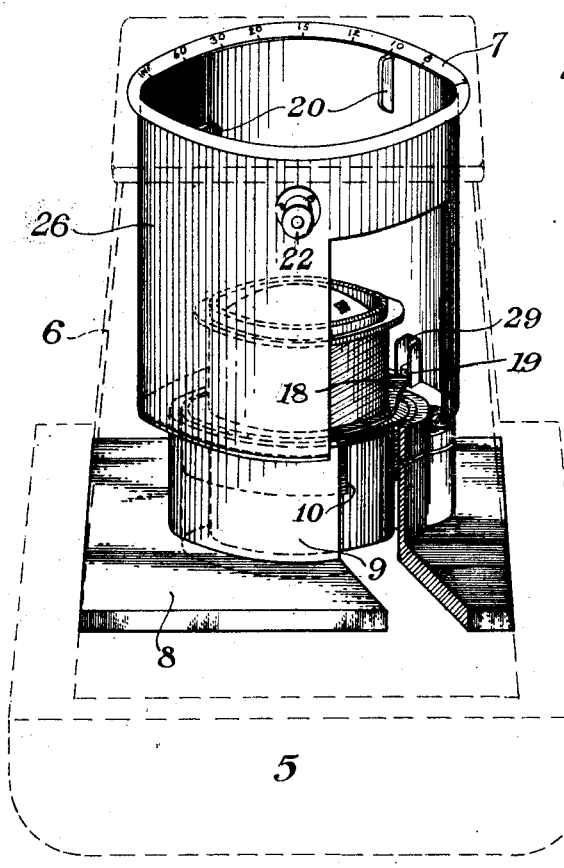
Figure 2:
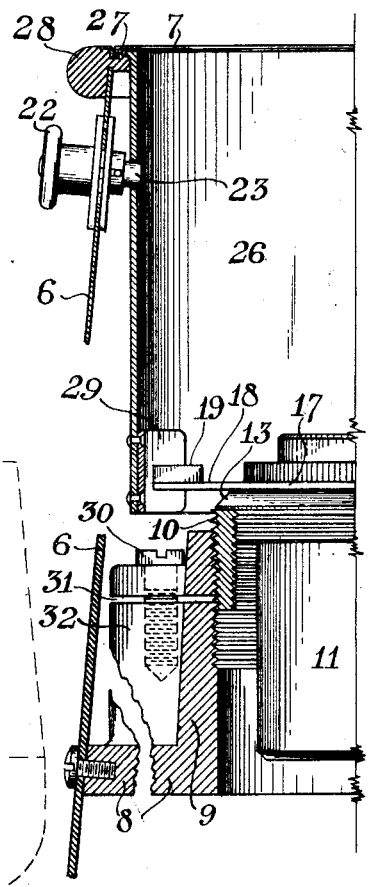
Figure 4:
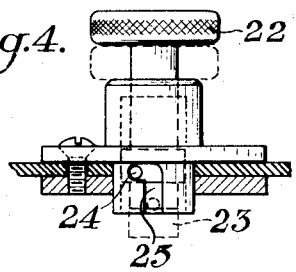
Figure 3:
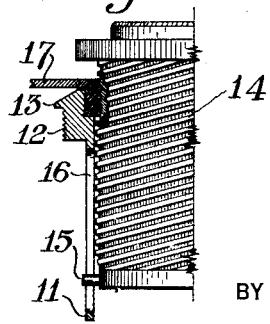

For a clearer understanding of the invention reference is made to the drawings in which Fig. 1 is a perspective view of a lens mount, a lens unit and a focus adjusting member with certain of the parts broken away for clearness in illustration and with the outer camera structure indicated in broken line; Fig. 2 is a portion of a vertical sectional view of the structure shown in Fig. 1; Fig. 3 is a side view partially in section of a fragment of the inner and outer barrels of the lens mount with the adjustable focusing member in threaded engagement with both of these barrels; Fig. 4 is a side view of a lock by means of which the lens unit may be held focused at infinity.

In Fig. 1, 5 designates a magazine represented in broken lines and 6 indicates a shield in the form of a truncated cone, also indicated in broken lines, and which may be circular or polygonal in cross section. The free end of the cone is provided with a circular opening bounded by a circular band 7 bearing a series of graduations indicating the various focusing adjustments.

In the cone illustrated in Figs. 1 and 2 there is provided a lens mount 8 preferably shaped to conform to the inner surface of the cone. This mount is provided with a circular opening bordered by an upstanding rim 9 bordered at one side by a threaded lug 32 through which a kerf 31 is cut extending through the adjacent side of the rim. As best shown in Fig. 2 the upper end of the rim 9 has an interiorly threaded portion into which a threaded adapter ring 10 is screwed. This adapter serves to fasten the lens unit, to be described, to the rim 9 of the support. The lens unit, as is well-known, comprises an outer barrel 11 terminating at its upper edge in a threaded portion 12 and a flange 13, and an inner barrel 14 supporting one or more lenses of well-known type. The outer surface of the barrel 14 is spirally threaded and is provided with one or more pins 15 movable up and down in straight vertical guide slots 16 in the outer barrel. In order to effect relative movement between the inner and outer barrels to change the focusing of the lens unit there is provided an annular plate 17 having a depending flange, the inner surface of which is threaded to engage the spiral threads on the barrel 14 and the outer surface of which is provided with fine threads engaging the inner threaded portion 12 of the outer barrel. The plate 17 also has an integral arm 18 provided with upstanding ears 19. This arm is adjusted by means of a cylinder 26 open at its top and bottom and supported at its upper end. This supporting means comprises an annular notch 27 in the end plate 28 of the cone in which a flange on the upper end of the cylinder may rotate, while the circular band 7 holds the cylinder 26 in position, so that it is suspended within the cone. Near its upper end the cylinder is provided with grips 20 by which it may be rotated. On one side of the cylinder near its lower edge a channel-shape member 29 is riveted in such position that the member may engage the ears 19 on the arm 18 so that the plate 17 may be rotated with the cylinder. By this arrangement the lens unit may be readily focused, and yet the cylinder 26 is freely supported independently of the lens unit, so that any abnormal stress on the cylinder is not communicated to the lens unit.

In assembling the camera the lens unit is screwed into the adapter ring 10 until the flange 13 engages the upper edge of the ring. The lens unit and the adapter ring are then screwed into the rim 9 to the proper distance to give the desired permanent adjustment of the lens unit after which the set screw 30 is then screwed down to close the kerf 31 partially, thereby gripping the adapter in adjusted position. Since the camera, when it is used for aerial work must be focused at infinity, the set screw is set with the elements in the position shown in Fig. 2 when the lens unit is focused at infinity and provision is made so that the focus-adjusting cylinder cannot be inadvertently moved at this time. For this purpose a latch 22 is mounted in the cone 6 having a portion 23 engaging a hole in the cylinder. When it is desired to change the focus to a lesser distance than infinity the latch 22 is moved to withdraw the portion 23 from the opening of the cylinder where it is held in its outward position by the pin 24 engaging the upper portion of the bayonet slot 25 as shown in Fig. 4. With the latch in this outer position the photographer may change the focus of the lens any desired amount by engaging the grips 20 and rotating the cylinder 19 together with the threaded ring 17. As the ring 17 rotates the inner threaded portion of its flange engages the high pitched spiral threaded portion of the inner barrel 14 causing this barrel with the lens unit carried thereby, to be moved upward or downward under the guidance of the pins 15 on the inner barrel engaging the slots 16 on the outer barrel.

The present disclosure is merely for purposes of description and it will be understood that there may be many variations and modifications of the arrangement within the scope of the claims without departing from the spirit of the invention.

What I claim is:

1. In combination with a camera, a lens unit, an adjustable support for said lens unit, a shield attached to said camera and enclosing said lens unit, and means actuated at one end of said shield for adjusting said support whereby the focusing of said lens unit is readily effected.

2. In combination with a camera, a lens unit, an adjustable support for said lens unit, a light shield attached to said camera and enclosing said lens unit, said shield extending beyond the free end of said unit, and a cylindrical member engaging a portion of said support and actuated at the free end of said shield.

3. In combination with a camera, a lens unit, an adjustable support for said lens unit, a cone attached to said camera and extending beyond the free end of said lens unit, said cone being provided at its free end with an opening having a diameter slightly larger than the diameter of said lens unit, and a cylindrical member engaging a portion of said support within said cone and surrounding said lens unit, the free end of said cylinder substantially registering with the edge of the opening in said cone.

4. A lens mount comprising an outer barrel, an inner barrel, lenses supported by said inner barrel, said outer barrel being interiorly threaded and said inner barrel being exteriorly threaded, and a threaded member engaging the threads of both of said barrels, operating means for said threaded member extending parallel to the axis of the lens mount at opposite sides thereof and projecting beyond the free end of said mount.

5. A lens mount comprising a fixed outer barrel having a portion interiorly threaded, a movable inner barrel provided with a lens, said inner barrel being exteriorly threaded, a threaded ring engaging the threads of both of said barrels, and a hollow cylinder engaging a portion of said ring, said cylinder having its axis common to the axis of said lens and projecting beyond the free end thereof.

6. In combination with a camera, a lens unit, an adjustable support for said lens unit, a shield on said camera surrounding said lens unit and extending beyond the free end thereof, said shield being provided at its free end with an opening having a diameter slightly larger than the diameter of said lens unit, and a cylindrical member rotatably mounted on said shield and surrounding said lens unit to engage a portion of said support.

7. In combination with a camera, a lens unit, an adjustable support for said lens unit including a rotatable arm, a cone attached to said camera and extending beyond the free end of said lens unit, said cone being provided at its free end with an opening having a diameter slightly larger than the diameter of said lens unit, and a cylindrical member mounted in said cone near its free end and provided with a channel member engaging said arm whereby said arm may be rotated with said cylinder.

In witness whereof, I hereunto subscribe my name this 10th day of May 1930.

ARTHUR WHEELER.